United States Patent [19]

Ohara et al.

[11] Patent Number: 5,647,894
[45] Date of Patent: Jul. 15, 1997

[54] GAS SEPARATING COMPOSITE MEMBRANE AND PROCESS FOR PRODUCING THE SAME

[75] Inventors: Tomomi Ohara; Hisao Hachisuka; Ping Xu; Akira Shimazu; Kenichi Ikeda, all of Osaka, Japan

[73] Assignee: Nitto Denko Corporation, Osaka, Japan

[21] Appl. No.: 478,519

[22] Filed: Jun. 7, 1995

[30] Foreign Application Priority Data

Jun. 8, 1994 [JP] Japan .................................. 6-126487

[51] Int. Cl.$^6$ .................................. B01D 53/22
[52] U.S. Cl. .................. 96/13; 96/11; 96/14; 55/DIG. 5
[58] Field of Search ................... 96/11–14; 428/473.5; 55/524, 527, 528, DIG. 5

[56] References Cited

U.S. PATENT DOCUMENTS

| Re. 30,351 | 7/1980 | Hoehn et al. | 96/4 X |
|---|---|---|---|
| 3,822,202 | 7/1974 | Hoehn | 96/4 X |
| 3,899,309 | 8/1975 | Hoehn et al. | 96/4 X |
| 4,440,643 | 4/1984 | Makino et al. | 96/13 X |
| 4,813,983 | 3/1989 | Nohmi et al. | 55/158 |
| 4,952,220 | 8/1990 | Langsam et al. | 96/13 |
| 4,988,371 | 1/1991 | Jeanes et al. | 96/13 X |
| 5,042,992 | 8/1991 | Blinka et al. | 96/14 X |
| 5,165,963 | 11/1992 | Matsumoto et al. | 427/245 |
| 5,178,650 | 1/1993 | Hayes | 96/14 X |
| 5,178,940 | 1/1993 | Matsumoto et al. | 96/13 |
| 5,266,100 | 11/1993 | Simmons | 96/14 X |
| 5,286,539 | 2/1994 | Kusuki et al. | 96/13 X |
| 5,320,650 | 6/1994 | Simmons | 96/14 |
| 5,391,219 | 2/1995 | Matsumoto et al. | 95/51 |

FOREIGN PATENT DOCUMENTS

| 0409265 | 1/1991 | European Pat. Off. | 96/13 |
|---|---|---|---|
| 5-146650 | 6/1993 | Japan . | |
| WO92/04109 | 3/1992 | WIPO . | |

*Primary Examiner*—Robert Spitzer
*Attorney, Agent, or Firm*—Sughrue, Mion, Zinn, Macpeak & Seas

[57] ABSTRACT

A gas separating composite membrane comprising two types of polyimide resin layers having different molecular structures and each having solubility in an organic solvent different from each other, the two layers being laminated being substantially independent or via a mixed layer, the first polyimide resin layer comprising a porous polyimide supporting membrane having a nitrogen gas permeation flux density at 25° C. of at least 2 $Nm^3/m^2/h/atm.$, and the second polyimide resin layer, which contributes to a gas separating performance comprising a fluorine-containing polyimide thin film containing at least three fluorine atoms in a repeating molecular structure unit which constructs the second polyimide resin layer has a very high gas permeation flux density while maintaining a high gas permeability, excels in heat resistance and chemical resistance, and satisfies a practical use in terms of cost.

12 Claims, No Drawings

GAS SEPARATING COMPOSITE MEMBRANE AND PROCESS FOR PRODUCING THE SAME

FIELD OF THE INVENTION

This invention relates to a fluorine-containing polyimide composite membrane for separating a gas comprising a porous polyimide supporting membrane on which a fluorine-containing polyimide thin film composed of a polyimide resin having a different molecular structure and having solubility in an organic solvent different from that of the polyimide resin of the supporting membrane is laminated and to a process for producing the same. More specifically, the invention relates to a fluorine-containing polyimide composite membrane for separating a specific component such as hydrogen, carbon dioxide gas, oxygen, steam, an organic vapor, or ion, from an industrial gas and concentrating it, and to a process for producing the same.

BACKGROUND OF THE INVENTION

Because of its high glass transition temperature and rigid molecular chain structure, polyimide has been known as a raw material for separating membrane excellent in heat resistance and chemical resistance, etc., and various separating membranes using polyimides have been studied. For example, U.S. Pat. Nos. 4,378,400 and 4,959,151 disclose aromatic polyimides using biphenyl tetracarboxylic dianhydride, JP-A-5-7749 (the term "JP-A" used herein means Japanese unexamined patent publication), U.S. Pat. Nos. 3,822,202, 3,899,309, 4,532,041, 4,645,824, 4,705, 540, 4,717,393, 4,717,394, 4,838,900, 4,897,092, 4932,982, 4,929,405, 4,981,497, 5,042,992, etc. disclose fluorine-containing aromatic polyimides.

Furthermore, polyimide systems using aliphatic or alicyclic tetracarboxylic dianhydrides are disclosed in U.S. Pat. Nos. 4,964,887, 4,988,371, etc.

However, no polyimide satisfies the permeability and separating performance requirements at the same time. On the other hand, U.S. Pat. Nos. 3,822,202 and 4,717,393 disclosed that the fluorine-containing aromatic polyimide composite membranes solve the above problem and satisfy permeability and separating performance at the same time on a uniform membrane level, but they have problems in terms of practical use on a commercial scale because of cost. Thus they cannot be put into a practical use. Moreover, as described in JP-A-62-216622, it is relatively easy to form a composite membrane having a polymer other than polyimide such as polystyrene, or poly-2,6-dimethylphenylene supported on a polyimide supporting membrane. However, in the case where a polyimide thin film is formed on a polyimide supporting membrane, e.g., by coating, the polyimide supporting membrane is dissolved in a solvent for use in coating, etc. Consequently, no composite membrane having a polyimide thin film formed on a polyimide supporting membrane and having a good balance of various performances has yet been known.

SUMMARY OF THE INVENTION

The present invention is attained in order to solve these problems, based on the finding of a gas separating composite membrane having a very high gas permeation flux density while maintaining a high gas permeability, excellent heat resistance and chemical resistance, and practical in terms of cost.

An object of the present invention is, therefore, to provide a gas separating composite membrane comprising two types of polyimide resin layers having different molecular structures and each having solubility in an organic solvent different from the other, the two layers being laminated and being substantially independent or via a mixed layer, the first polyimide resin layer comprising a porous polyimide supporting membrane having a nitrogen gas permeation flux density at 25° C. of at least 2 $Nm^3/m^2/h/atm.$, and the second polyimide resin layer, which contributes to gas separating performance, comprising a fluorine-containing polyimide thin film containing at least three fluorine atoms in a repeating molecular structure unit which constructs the second polyimide resin layer.

DETAILED DESCRIPTION OF THE INVENTION

The terminology "the two layers being laminated being substantially independent or via a mixed layer" as used herein means "the two layers being laminated, with a distinct interface or an area where the two types of polyimides are mixed being present between the two layers".

It is required that the first polyimide resin layer of the present invention has a nitrogen gas permeation flux density at 25° C. of at least 2 $Nm^3/m^2/h/atm$. If it is less than 2 $Nm^3/m^2/h/atm$, the permeation resistance of the supporting film becomes too large, and the permeation rate after film-formation does not satisfy any practical requirement. The nitrogen gas permeation flux density can be measured with a soap-film flow meter supplying a pure nitrogen gas from a steel gas cylinder to a membrane consisting of the first polyimide resin only.

The thickness of the first polyimide resin layer is preferably from 0.5 μm to 200 μm, and the weight-average molecular weight of the first polyimide resin is preferably from 50,000 to 500,000 (intrinsic viscosity at 30° C.: 0.55 to 1.00).

The second polyimide resin layer is a layer which contributes to a gas separating performance and comprises a fluorine-containing polyimide thin film containing at least three fluorine atoms in a repeating molecular structure unit which constructs the second polyimide resin layer. It is preferable to contain at least one —$CF_3$ group in a repeating molecular structure unit which comprises the second polyimide resin layer. Moreover, the fluorine content (the fluorine atom's number in the repeating molecular structure unit) in the fluorine-containing polyimide thin film is preferably at least 6. If the content is less than 3, the solubility in a solvent is decreased, making it difficult to form a film and, thus, the gas separating composite membrane obtained lacks film-forming ability. Consequently, it is difficult to obtain a stable gas separating composite membrane having a high quality. If it is not less than 3, a stable gas separating composite membrane can be formed, and if it is not less than 6, a more stable gas separating composite membrane can be formed. However, if it exceeds 12, the cost for the raw material becomes high, and the practical applicability is decreased accordingly. In the case where the porous polyimide supporting membrane which forms the first polyimide resin layer is a fluorine-containing polyimide resin, the fluorine content (the fluorine atom's number in the repeating molecular structure unit) in the fluorine-containing polyimide thin film used is at least 1.5 times that of the fluorine content in the porous polyimide supporting membrane. If the content is less than 1.5 times, when a polyimide solution for film-forming is applied to the supporting membrane, the supporting membrane is also dissolved, making it difficult to form a film, which means that it is difficult to obtain a stable gas separating composite membrane having a high quality.

According to a preferred embodiment for enhancing the permeability of the gas separating composite membrane obtained in the present invention, the thickness of the second polyimide resin layer which forms a fluorine-containing polyimide thin film after being formed into a film is 3 μm or less, preferably from 0.01 to 3 μm, more preferably from 0.1 to 3 μm. If the thickness is less than 0.01 μm, the fluorine-containing polyimide thin film has a tendency to bring about a defect and thus, the separating performance is unstable and is often deteriorated. Conversely, if it exceeds 3 μm, the film thickness of the fluorine-containing polyimide film is unduly increased to decrease the permeation rate. Consequently, deviation from the range is not preferable. The weight average molecular weight of the second polyimide resin is preferably from 50,000 to 500,000.

The raw material for gas separating composite film which forms the porous polyimide supporting membrane of the present invention is preferably a polyimide resin comprising as a main component a repeating unit represented by formula (1):

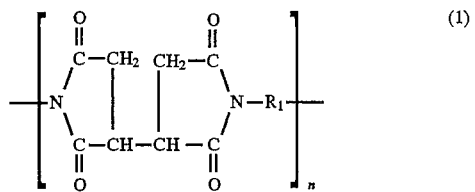

wherein $R_1$ is a divalent aromatic, alicyclic or aliphatic hydrocarbon residue or a divalent organic residue having the two or more hydrocarbon residues bonded by a divalent organic bridging group, and n represents an integer of from 100 to 1,500. These polyimide resins can also be used as a mixture.

Examples of the aliphatic residues of $R_1$ include straight or branched chain alkylene groups having 1 to 20 carbon atoms; and examples of the alicyclic residues of $R_1$ include cycloalkylene groups having 5 to 12 carbon atoms which may have an alkyl substituent. Examples of the aromatic residues of $R_1$ include a phenylene group and naphtylene group having 6 to 12 carbon atoms which may have an alkyl substituent. The alkyl substituent preferably has 1 to 4 carbon atoms. In the present invention, $R_1$ may be a divalent organic residue in which the hydrocarbon residue is bonded by a divalent organic bridging group. Examples of such divalent organic bridging groups include:

$-CH_2-$, $-C(CH_3)_2-$, $-CO-$, $-O-$, $-S-$, $-SO_2-$,

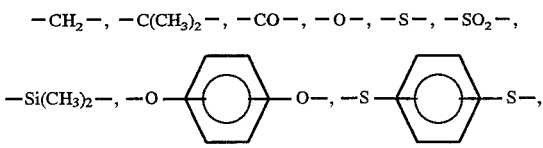

and $-Si(CH_3)_2OSi(CH_3)-$.

In order to have excellent solvent resistance, it is particularly preferable that $R_1$ is a divalent aromatic hydrocarbon residue or a divalent organic residue in which at least two aromatic hydrocarbon residues are bonded by the bridging group(s), and examples of such divalent organic residues include:

, and

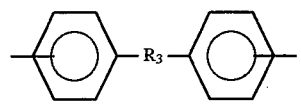

wherein $R_3$ is $-CH_2-$, $-C(CH_3)_2-$, $-CO-$, $-O-$, $-S-$, or $-SO_2-$.

The raw material for the gas separating composite membrane which is used for forming the fluorine-containing polyimide thin film is preferably a fluorine-containing polyimide resin comprising as a main component a repeating unit represented by formula (2):

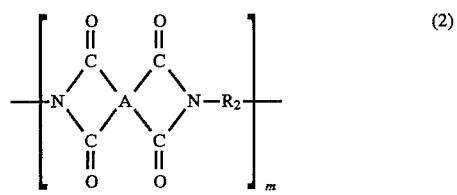

wherein A is a tetravalent aromatic, alicyclic or aliphatic hydrocarbon residue, $R_2$ is a divalent aromatic hydrocarbon residue or a divalent organic group in which the aromatic hydrocarbon residues are bonded by a divalent organic bridging group, at least one of A and $R_2$ has an organic group having at least one fluorine atom, A and $R_2$ have at least three fluorine atoms in total, and m represents an integer of about 50 to 800.

The residue A shown in formula (2) is a tetravalent organic residue comprising aromatic, alicyclic or aliphatic hydrocarbon, and examples of tetravalent organic residues which can be preferably used include, but are not restricted to:

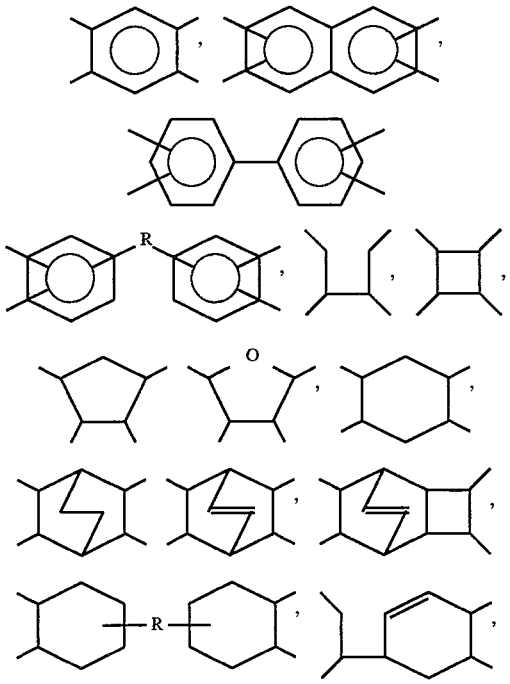

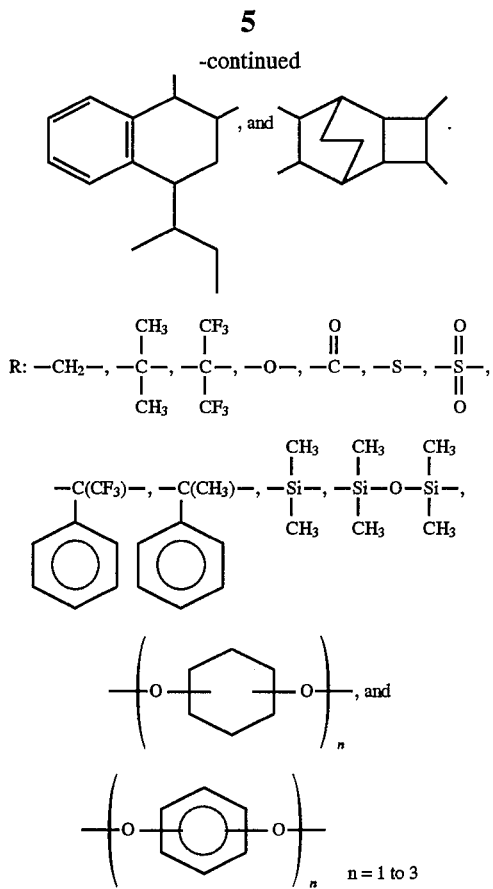

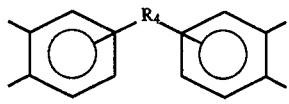

Moreover, tetravalent organic residues represented by the formula:

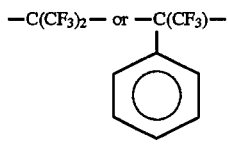

wherein R₄ is $-C(CF_3)_2-$ or $-C(CF_3)-$
$\phantom{-C(CF_3)_2-or\ -}|$
$\phantom{-C(CF_3)_2-or-}C_6H_5$ are particularly preferred as the residue A.

As described above, R₂ is a divalent aromatic hydrocarbon residue or a divalent group in which the aromatic hydrocarbon residues are bonded by a divalent organic bridging group, and divalent organic residues represented by the formula:

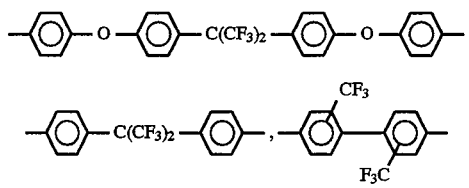

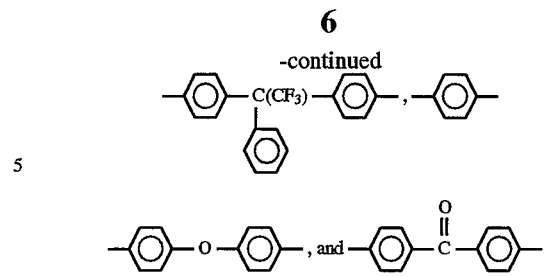

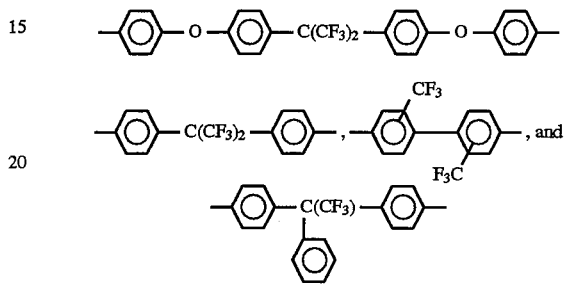

are preferably used as R₂.

Moreover, as the organic group containing fluorine, hexafluoroisopropyl group, (—C(CF₃)₂—), is preferably used, and in R₂, a divalent organic residue having a structure in which two benzene rings are bonded by hexafluoroisopropyl group is preferably used.

In the gas separating composite membrane obtained in the present invention, it is preferable to apply an elastomeric polymer on the surface of the fluorine-containing polyimide thin film. The formation of a thin film of the elastomeric polymer and the lamination thereof are preferable in terms of covering defects on the surface of the gas separating composite film and at the same time preventing injury of the surface. The thin film of the elastomeric polymer preferably has a thickness of 0.01 μm to 100 μm. As the elastomeric polymer, a crosslinking silicone resin is preferably used. Such a crosslinking silicone resin is a silicone resin which is soluble in an organic solvent before being crosslinked, but which is insoluble in the organic solvent after being crosslinked. The silicone resin can be formed into a film, for example, according to the method described in JP-A-59-225705.

Although the process for producing the porous polyimide supporting membrane of the gas separating composite membrane according to the present invention is not specifically restricted, it can be preferably produced by the following two-stage polymerization process. The polyimide represented by formula (1) or (2) is obtained by the known polymerization process using tetracarboxylic dianhydride and the diamine component. Approximately equal molar amounts of the diamine compound and tetracarboxylic dianhydride are stirred in a polar solvent at a temperature of not more than 80° C., preferably from 0° to 60° C., to be polymerized into a polyamic acid. Examples of solvents which can be suitably used here include, but are not restricted to, N-methylpyrrolidone, pyridine, dimethylacetamide, dimethylformamide, dimethylsulfoxide, tetramethylurea, phenol, and cresol.

A tertiary amine compound such as trimethylamine, triethylamine, and pyridine and an imidation accelerator such as acetic anhydride, thionyl chloride, and carbodiimide are added into the resulting solution of the polyamic acid in the polar solvent and stirred at a temperature of 5° to 150° C. to be imidated. In carrying out the imidation, it is possible to add no imidation accelerator and to heat the polyamic acid solution to 100°–400° C., preferably 120°–300° C. to carry out the imidation. Alternatively, a polyamic acid powder obtained by the dropwise addition of the polyamic acid solution to a large amount of a solution such as acetone or an alcohol, a solid polyamic acid obtained by the distillation of the solvent from the polyamic acid solution (a settling agent may be added during the distillation to form a polyamic acid powder, which is filtered off), a uniform film obtained by casting the polyamic acid solution on a substrate followed by the distillation of the solvent or an asymmetric film obtained by a wet process may be heated to 100°–400° C. to be imidated.

The process for producing a gas separating composite membrane according to the present invention is characterized by applying onto a porous polyimide supporting membrane having a nitrogen gas permeation flux density at 25° C. of at least 2 $Nm^3/m^2/h/atm.$, obtained by forming a film from a solution, which is produced by dissolving a polyamic acid or a polyimide resin in a first organic solvent having a compatibility with water, and drying the film, a solution produced by dissolving a fluorine-containing resin having a molecular structure different from the polyamic acid or the polyimide resin in a second organic solvent which does not dissolve the porous polyamide supporting membrane but dissolves the fluorine-containing polyimide resin, followed by drying to laminate the fluorine-containing polyimide thin film on the porous polyimide supporting membrane.

The first organic solvent which can be used in the present invention is an organic solvent which has a compatibility with water and can dissolve the polyamic acid or the polyimide resin, and examples which can be preferably used are N-methyl-2-pyrrolidone, pyridine, dimethylacetamide and dimethylformamide, with N-methyl-2-pyrrolidone and dimethylformamide being particularly preferred.

The second organic solvent which can be used in the present invention is a solvent which does not dissolve the polyimide resin of raw material for the supporting membrane but dissolves the fluorine-containing polyimide resin as the raw material for the thin film having a molecular structure different from that of the polyimide resin as the supporting membrane. Examples of such solvents which can be preferably used are ethers and halogenated hydrocarbons, and particularly diethylene glycol dimethyl ether, diethylene glycol diethyl ether, diethylene glycol dibutyl ether, etc. as the ethers and chloroform, dichloroethane, trichloroethane, etc. as the halogenated hydrocarbons are suitably used.

The porous polyimide supporting membrane of the present invention is a membrane having pores having such a pore size that general gas can permeate by Hagen-Poiseuille flow or Knudsen diffusion, and the flow of the permeation is dominant with respect to gas permeation of the membrane.

The film-forming process of the porous polyimide supporting membrane in the gas separating composite membrane of the present invention will now be described. The film-forming process of the porous polyimide supporting membrane is not specifically restricted, but it can be preferably produced by the following conventional method: A polyimide solution in N-methyl-2-pyrrolidone or dimethylformamide, which is the first organic solvent having a compatibility with water is used to form a film by a wet process. For example, a film can be formed according to the process described in JP-A-55-152507, JP-A-57-139104, H. Strathmann, Desalination 26, 85, (1978), or U.S. Pat. No. 3,925,211.

Subsequently, the process for forming the fluorine-containing polyimide thin film on the resulting porous polyimide supporting membrane will be described. As the formation of the fluorine-containing polyimide thin film on the porous polyimide supporting membrane in the present invention, a process which comprises bringing the porous polyimide supporting membrane in contact with a solution for forming a fluorine-containing polyimide thin film, i.e., a solution of the fluorine-containing resin dissolved in the second organic solvent such as an ether or a halogenated hydrocarbon, applying the solution onto the supporting membrane by means of cloth, etc., or impregnating the supporting membrane in the solution, and then removing the organic solvent is suitably used.

The solvent is suitably removed by a process of thermally drying the solvent or a process of impregnating the membrane in a solution having an affinity to the solvent. The air-drying or thermal drying is carried out at a temperature of 0° to 400° C., preferably from 25° to 200° C. The solution to be used for removing the solvent by impregnation is preferably water or an alcohol such as methanol, ethanol or isopropyl alcohol.

The concentration of the polyimide solution for thin-film formation is generally in the range of from 0.6 to 30% by weight, preferably from 0.8 to 8% by weight.

Since the gas separating composite membrane according to the present invention comprises a porous polyimide supporting membrane on which a polyimide thin film composed of a polyimide resin having a different molecular structure is laminated, and since at least the polyimide resin of the thin film is a fluorine-containing resin, the composite membrane of the present invention has a high gas permeability and high gas selectivity in comparison with the conventional polyimide membrane, excels in resistance and cost, and thus, satisfies the practical requirements.

EXAMPLES

The present invention will now described by referring to Examples, but the present invention is not restricted thereto.

EXAMPLE 1

After an N-methyl-2-pyrrolidone solution containing 16% by weight of polyimide of formula (1) represented by formula (3):

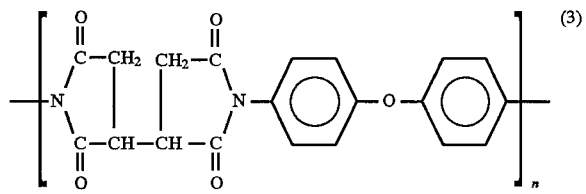

was applied to a non-woven fabric, it was soaked in a water at 46° C., and a film was formed according to a usual wet process to obtain a 70 μm thick porous supporting membrane as a first polyimide resin layer. Subsequently, the surface of the supporting membrane was brought into contact with a diethylene glycol dimethyl ether solution containing 1% by weight of a fluorine-containing polyimide resin of formula (2) (5,5'-2,2,2-trifluoro-1-(trifluoromethyl) ethylidene-bis-1,3-isobenzofurane-dione (6FDA)/2,2-bis(4- aminophenyl)hexafluoropropane (BAAF)) represented by formula (4):

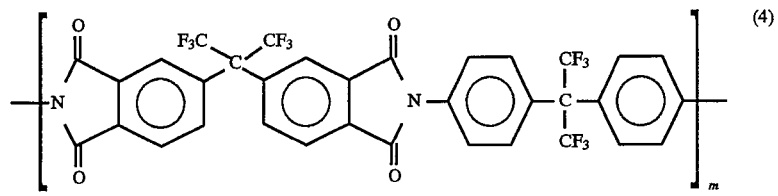

to coat the fluorine component, followed by drying at 110° C. for 15 minutes to obtain a thin film of the second polyimide resin layer. The proportion of the polyimide components in the resulting thin film relative to the total polyimide was obtained by using the molecular weights per the repeating units of the first and the second polyimide resin layers, and measuring the weight change before and after the application of the thin film of the second polyimide resin layer. The proportion of the polyimide components (6FDA/BAAF components) in the resulting thin film relative to the total polyimide in this Example was 3.4 mol %. The carbon dioxide gas permeation rate and carbon dioxide gas/methane gas separation coefficient of the resulting separating composite membranes are shown in Table 1.

Furthermore, a crosslinking silicone resin solution (a 3 wt % hexane solution of RTV 615 produced by GE Silicones) as the elastomeric polymer was applied on the surface of the membrane and dried to form and laminate a thin film of the elastomeric polymer. The carbon dioxide gas permeation rate and carbon dioxide gas/methane gas separation coefficient of the resulting separating composite membrane are also shown in Table 1. The thicknesses of the first polyimide resin layer, the second polyimide resin layer and the elastomeric polymer layer was 100 μm, 0.4 μm, and 0.4 μm, respectively.

TABLE 1

| Example No. | First Polyimide Resin (Polyimide Supporting Membrane) | | | Second Polyimide Resin (Polyimide Thin Film) | | | | | | Gas Permeation Performances of Composite Membrane*[4] | |
|---|---|---|---|---|---|---|---|---|---|---|---|
| | Polyimide Resin Component | $N_2$ Permeation Rate ($\times 10^2$)*[1] | First Organic Solvent*[2] | Fluorine-containing Polyimide Resin Component | Amount*[3] (wt %) | Number of F | Number of $-CF_3$ | Second Organic Solvent | Thickness | $CO_2$ Permeation Rate*[1] | $CO_2/CH_4$ Gas Separation Coefficient |
| Example 1 | Formula (3) | 4.9 | A | Formula (4) | 1 | 12 | 4 | DEGDME*[5] | 0.4 | (0.51) 0.49 | (26) 30 |
| Example 2 | Formula (3) | 4.9 | A | Formula (7) | 1 | 12 | 4 | DEGDME | 0.5 | (0.33) 0.26 | (25) 27 |
| Example 3 | Formula (3) | 4.9 | A | Formula (8) | 1 | 12 | 4 | DEGDME | 0.5 | (0.30) 0.16 | (14) 22 |
| Example 4 | Formula (5) | 5.2 | A | Formula (4) | 1 | 12 | 4 | DEGDME | 0.4 | (0.71) 0.62 | (25) 27 |
| Example 5 | Formula (5) | 5.2 | A | Formula (7) | 1 | 12 | 4 | DEGDME | 0.4 | (0.52) 0.50 | (18) 20 |
| Example 6 | Formula (5) | 5.2 | A | Formula (8) | 1 | 12 | 4 | DEGDME | 0.4 | (0.27) 0.23 | (10) 13 |
| Example 7 | Formula (6) | 2.7 | A | Formula (4) | 1 | 12 | 4 | DEGDME | 0.4 | (0.27) 0.20 | (38) 28 |
| Example 8 | Formula (6) | 2.7 | A | Formula (7) | 1 | 12 | 4 | DEGDME | 0.4 | (0.20) 0.14 | (20) 22 |
| Example 9 | Formula (6) | 2.7 | A | Formula (8) | 1 | 12 | 4 | DEGDME | 0.4 | (0.10) 0.08 | (22) 27 |
| Example 10 | Formula (3) | 5.2 | A | Formula (4) | 3 | 12 | 4 | DEGDME | 0.9 | (0.31) 0.26 | (40) 42 |
| Example 11 | Formula (3) | 5.2 | A | Formula (4) | 5 | 12 | 4 | DEGDME | 1.7 | (0.10) 0.08 | (50) 54 |
| Example 12 | Formula (3) | 5.2 | A | Formula (4) + (7) | 1 | 12 | 4 | DEGDME | 0.6 | (0.30) 0.22 | (22) 24 |
| Example 13 | Formula (3) | 4.9 | A | Formula (9) | 1 | 6 | 2 | DEGDME | 0.5 | (0.20) 0.16 | (40) 41 |
| Example 14 | Formula (3) | 6.2 | B | Formula (4) | 3 | 12 | 4 | DEGDME | 1.0 | (0.35) 0.26 | (50) 52 |
| Example 15 | Formula (3) | 4.9 | A | Formula (4) | 1 | 12 | 4 | DEGDEE*[6] | 0.5 | (0.55) 0.42 | (45) 41 |
| Example 16 | Formula (3) | 5.2 | A | Formula (4) | 0.5 | 12 | 4 | DEGDME | 0.05 | (5.00) 1.05 | (0.7) 3.0 |
| Example 17 | Formula (3) | 5.2 | A | Formula (4) + (7) | 0.5 | 12 | 4 | DEGDME | 0.02 | (7.12) 2.11 | (0.7) 1.1 |
| Comparative Example 1 | Formula (3) | 5.2 | A | Formula (4) | 10 | 12 | 4 | DEGDME | 3.5 | (0.024) 0.020 | (52) 54 |

TABLE 1-continued

| | First Polyimide Resin (Polyimide Supporting Membrane) | | | Second Polyimide Resin (Polyimide Thin Film) | | | | | | Gas Permeation Performances of Composite Membrane[*4] | |
|---|---|---|---|---|---|---|---|---|---|---|---|
| Example No. | Polyimide Resin Component | $N_2$ Permeation Rate ($\times 10^2$)[*1] | First Organic Solvent[*2] | Fluorine-containing Polyimide Resin Component | Amount[*3] (wt %) | Number of F | Number of —$CF_3$ | Second Organic Solvent | Thickness | $CO_2$ Permeation Rate[*1] | $CO_2/CH_4$ Gas Separation Coefficient |
| Comparative Example 2 | Formula (3) | 4.6 | A | Formula (9) | 1 | 6 | 2 | N-Methyl-2-pyrrolidone | Impossible | (N.D.[*7]) | (N.D.) |
| Comparative Example 3 | Formula (3) | 4.6 | A | Formula (5) | 1 | 0 | 0 | N-Methyl-2-pyrrolidone | Impossible | (N.D.) | (N.D.) |

[*1] unit: $Nm^3/m^2/h/atm$
[*2] A: N-Methyl-2-pyrrolidone, B: Dimethyl formamide
[*3] The concentration of the solution for applying a fluorine-containing polyimide resin in the formation of a polyimide thin film.
[*4] The value in parentheses is a value immediately before the formation of a silicone resin film.
[*5] Diethylene glycol dimethyl ether
[*6] Diethylene glycol diethyl ether
[*7] N.D.: Not determined.

EXAMPLES 2 TO 9

Gas separating composite membranes were obtained in the same manner as in Example 1, except for using the polyimide resin represented by formula (5) or (6) in place of the resin represented by formula (3), or the fluorine-containing polyimide resin represented by formula (7) or (8) in place of the resin represented by formula (4). The carbon dioxide gas permeation rate and carbon dioxide gas/methane gas separation coefficient of the resulting separating composite membranes are shown in Table 1.

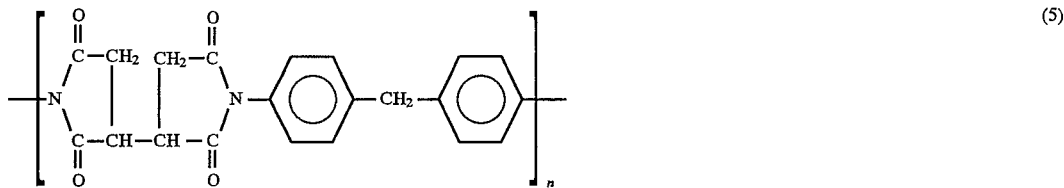

(5)

(6)

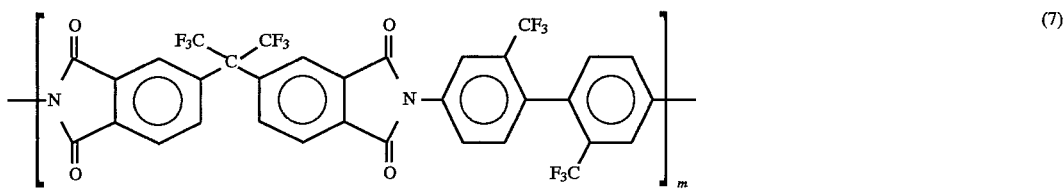

(7)

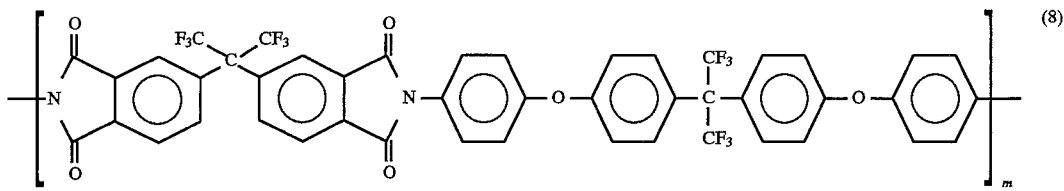

(8)

EXAMPLE 10

A gas separating composite membrane was obtained in the same manner as in Example 1, except for coating the fluorine-containing component by the impregnation in a diethylene glycol dimethyl ether solution containing 3% by weight of the fluorine-containing polyimide resin (6FDA/ BAAF) represented by formula (4). The proportion of the polyimide components (6FDA/BAAF components) in the resulting thin film relative to the total polyimide was 5.2 mol %. The carbon dioxide gas permeation rate and carbon dioxide gas/methane gas separation coefficient of the resulting separating composite membrane are shown in Table 1.

EXAMPLE 11

A gas separating composite membrane was obtained in the same manner as in Example 1, except for coating the fluorine-containing component by the impregnation in a diethylene glycol dimethyl ether solution containing 5% by weight of the fluorine-containing polyimide resin (6FDA/ BAAF) represented by formula (4). The proportion of the polyimide components (6FDA/BAAF components) in the resulting thin film relative to the total polyimide was 8.7 mol %. The carbon dioxide gas permeation rate and carbon dioxide gas/methane gas separation coefficient of the resulting separating composite membrane are shown in Table 1.

EXAMPLE 12

A gas separating composite membrane was obtained in the same manner as in Example 1, except for using a mixture of the fluorine-containing polyimide resins represented by formulae (4) and (7). The mixing ratio was 50/50 on a weight basis. The carbon dioxide gas permeation rate and carbon dioxide gas/methane gas separation coefficient of the resulting separating composite membrane are shown in Table 1.

EXAMPLE 13

A gas separating composite membrane was obtained in the same manner as in Example 1, except for using a fluorine-containing polyimide composition represented by formula (9):

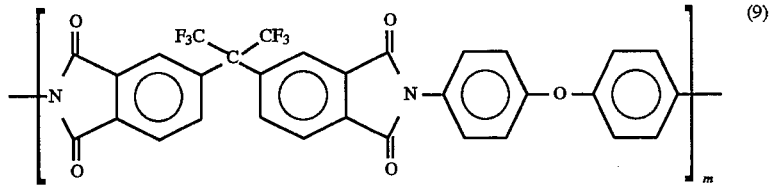

in place of the resin represented by formula (4). The carbon dioxide gas permeation rate and carbon dioxide gas/methane gas separation coefficient of the resulting separating composite membrane are shown in Table 1.

EXAMPLE 14

A gas separating composite membrane was obtained in the same manner as in Example 10, except for using dimethylformamide in place of N-methyl-2-pyrrolidone as the first organic solvent. The carbon dioxide gas permeation rate and carbon dioxide gas/methane gas separation coefficient of the resulting separating composite membrane are shown in Table 1.

EXAMPLE 15

A gas separating composite membrane was obtained in the same manner as in Example 1, except for using diethylene glycol diethyl ether in place of diethylene glycol dimethyl ether as the second organic solvent. The carbon dioxide gas permeation rate and carbon dioxide gas/methane gas separation coefficient of the resulting separating composite membrane are shown in Table 1.

EXAMPLE 16

A gas separating composite membrane was obtained in the same manner as in Example 1, except for using a diethylene glycol dimethyl ether solution containing 0.5% by weight of the fluorine-containing polyimide resin (6FDA/ BAAF) represented by formula (4) to apply the second polyimide resin layer to a thickness of 0.05 μm. The carbon dioxide gas permeation rate and carbon dioxide gas/methane gas separation coefficient of the resulting separating composite membrane are shown in Table 1.

EXAMPLE 17

A gas separating composite membrane was obtained in the same manner as in Example 1, except for using a diethylene glycol dimethyl ether solution containing 0.5% by weight of a mixture of the fluorine-containing polyimide resins represented by formulae (4) and (7) to apply the second polyimide resin layer to a thickness of 0.02 μm. The carbon dioxide gas permeation rate and carbon dioxide gas/methane gas separation coefficient of the resulting separating composite membrane are shown in Table 1.

COMPARATIVE EXAMPLE 1

A gas separating composite membrane was obtained in the same manner as in Example 1, except for using a diethylene glycol dimethyl ether solution containing 10% by weight of the fluorine-containing polyimide resin (6FDA/ BAAF) represented by formula (4) to apply the second polyimide resin layer to a thickness of 3.5 μm exceeding 3 μm. The proportion of the polyimide components (6FDA/ BAAF components) in the resulting thin film relative to the total polyimide was 56.8 mol %. The carbon dioxide gas permeation rate and carbon dioxide gas/methane gas separation coefficient of the resulting separating composite membrane are shown in Table 1. It was understood that if the proportion exceeded 10 mol %, the permeation rate of the gas permeability of the gas separating composite membrane was decreased, so that the resulting gas separating composite membrane was not suitable for practical use.

COMPARATIVE EXAMPLE 2

A gas separating composite membrane was obtained in the same manner as in Example 13, except for using N-methyl-2-pyrrolidone in place of diethylene glycol dimethyl ether as the second organic solvent. When the solution was applied, the polyimide supporting membrane of the first polyimide resin layer was also dissolved and, thus, a film could not be formed.

COMPARATIVE EXAMPLE 3

A gas separating composite membrane was obtained in the same manner as in Example 1, except for using a polyimide component containing no fluorine atom represented by formula (5) in place of the fluorine-containing polyimide component represented by formula (4). However, when the polyimide resin was tried to be dissolved in diethylene glycol dimethyl ether as the second organic solvent so as to be a polyimide resin concentration of 1% by weight, because of its low solubility, it could not be dissolved. Therefore, N-methyl-2-pyrrolidone was used as a second organic solvent. As a result, when the solution was applied, the polyimide supporting membrane of the first polyimide resin layer was also dissolved and, thus, no film could be formed.

While the invention has been described in detail with reference to specific embodiments, it will be apparent to one skilled in the art that various changes and modifications can be made to the invention without departing from its spirit and scope.

What is claimed is:

1. A gas separating composite membrane comprising two types of polyimide resin layers having different molecular structures and each having solubility in an organic solvent different from each other, the two layers being laminated being substantially independent or via a mixed layer, the first polyimide resin layer comprising a porous polyimide supporting membrane having a nitrogen gas permeation flux density at 25° C. of at least 2 Nm$^3$/m$^2$/h/atm., and the second polyimide resin layer, which contributes to a gas separating performance, comprising a fluorine-containing polyimide thin film containing at least three fluorine atoms in a repeating molecular structure unit which constructs the second polyimide resin layer and having a thickness of 3 μm or less.

2. The gas separating composite membrane of claim 1, wherein at least one —CF$_3$ group is contained in a repeating molecular structure unit which constructs the second polyimide resin layer.

3. The gas separating composite membrane of claim 1, wherein the thickness of the second polyimide resin layer is from 0.01 to 3 μm.

4. The gas separating composite membrane of claim 1, wherein the thickness of the second polyimide resin layer is from 0.1 to 3 μm.

5. The gas separating composite membrane of claim 1, wherein the porous polyimide supporting membrane comprises a polyimide resin comprising as a main component a repeating unit represented by the formula (1):

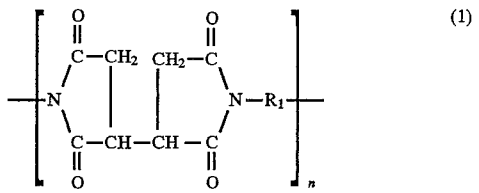

wherein R$_1$ is a divalent aromatic, alicyclic or aliphatic hydrocarbon residue or a divalent organic residue having the two or more hydrocarbon residues bonded by a divalent organic bridging group and n represents an integer of 100 to 1,500, and the fluorine-containing polyimide thin film comprises a fluorine-containing polyimide resin comprising as a main component a repeating unit represented by formula (2):

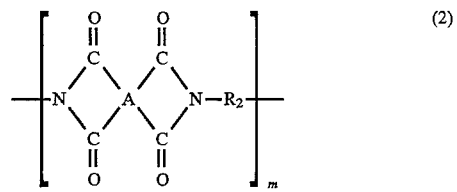

wherein A is a tetravalent aromatic, alicyclic or aliphatic hydrocarbon residue, R$_2$ is a divalent aromatic hydrocarbon residue or a divalent group in which the aromatic hydrocarbon residues are bonded by a divalent organic bridging group, at least one of A and R$_2$ has an organic group having at least one fluorine atom, A and R$_2$ have at least three fluorine atoms in total, and m represents an integer of about 50 to 800.

6. The gas separating composite membrane of claim 5, wherein R$_1$ is represented by the formula:

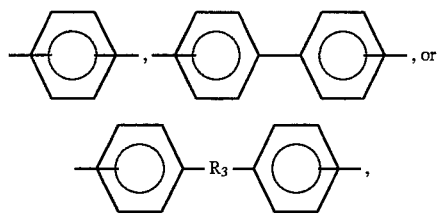

wherein R$_3$ is —CH$_2$—, —C(CH$_3$)$_2$—, —CO—, —O—, —S—, or —SO$_2$—, A is represented by the formula:

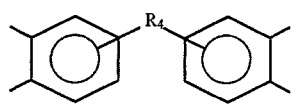

wherein R$_4$ is —C(CF$_3$)$_2$— or

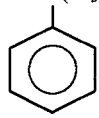

and R$_2$ is represented by the formula:

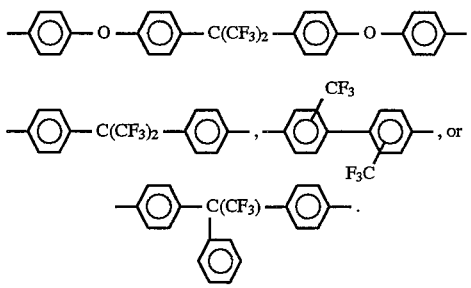

7. The gas separating composite membrane of claim 1, wherein an elastomeric polymer thin film is laminated on the fluorine-containing polyimide thin film.

8. The gas separating composite membrane of claim 7, wherein the elastomeric polymer thin film is a thin film formed by crosslinking a crosslinking silicone resin.

9. A process for producing a gas separating composite membrane which comprises:

applying onto a porous polyimide supporting membrane having a nitrogen gas permeation flux density at 25° C.

of at least 2 Nm$^3$/m$^2$/h/atm., obtained by forming a film from a solution, which is produced by dissolving a polyamic acid or a polyimide resin in a first organic solvent having a compatibility with water, and drying the film, a solution produced by dissolving a fluorine-containing polyimide resin having a molecular structure different from the polyamic acid or the polyimide resin in a second organic solvent which does not dissolve the porous polyamide supporting membrane but dissolves the fluorine-containing polyimide resin, followed by drying to laminate a fluorine-containing polyimide thin film on the porous polyimide supporting membrane.

10. The process of claim 9, wherein the first organic solvent is N-methyl-2-pyrrolidone, pyridine, dimethylacetamide or dimethylformamide, or a mixture of at least two of them.

11. The process of claim 9, wherein the second organic solvent is an ether or a halogenated hydrocarbon.

12. A process of claim 9, wherein an elastomeric polymer thin film is laminated on the fluorine-containing polyimide thin film.

* * * * *